United States Patent [19]

Laks et al.

[11] 4,182,686

[45] Jan. 8, 1980

[54] PLASTIC WAX CLEANING AND POLISHING COMPOSITION AND METHOD OF MAKING SAME

[75] Inventors: Sid Laks, Denver; Thomas S. Evans, Wheatridge, both of Colo.

[73] Assignee: Sid Laks, Denver, Colo.

[21] Appl. No.: 906,733

[22] Filed: May 17, 1978

[51] Int. Cl.² .............................................. C11D 9/30
[52] U.S. Cl. ..................... 252/119; 51/304; 51/305; 106/8; 252/117; 252/120; 252/130; 252/131
[58] Field of Search ................ 51/304, 305, 306, 307; 106/8, 3; 252/110, 111, 112, 113, 114, 115, 116, 117, 118, 119, 120, 132, 130, 131

[56] References Cited

U.S. PATENT DOCUMENTS

| 2,144,642 | 1/1939 | Stoughton | 106/271 |
| 2,482,667 | 9/1949 | Gray | 51/304 |
| 2,768,886 | 10/1956 | Twombly | 51/304 |
| 2,829,035 | 4/1958 | Doughty et al. | 51/304 |
| 3,522,186 | 7/1970 | Cambre | 252/112 |
| 3,660,128 | 5/1972 | Sheldahl | 106/271 |
| 3,865,756 | 2/1975 | Smith | 252/119 |
| 3,983,047 | 9/1976 | Vinson | 252/119 |
| 4,064,061 | 12/1977 | Henry | 252/119 |
| 4,071,333 | 1/1978 | Like | 51/304 |

*Primary Examiner*—Donald J. Arnold
*Attorney, Agent, or Firm*—Reilly and Young

[57] ABSTRACT

A plastic polishing composition and method for making such a composition in emulsion form containing a fatty acid, an alkanolamine, cetyl alcohol, glyceryl monostearate, and liquid forms a carrier for an abrasive material, an acrylic filler, an anti-static agent, and a hydrocarbon solvent. The composition cleans as it polishes translucent and opaque plastic surfaces by removing foreign matter and filling minute surface scratches in a one-step operation.

13 Claims, No Drawings

PLASTIC WAX CLEANING AND POLISHING COMPOSITION AND METHOD OF MAKING SAME

BACKGROUND OF THE INVENTION

A number of commercial polishing emulsion compositions are available. None however is particularly suited for the polishing of translucent or opaque plastics. The available compositions are primarily intended for use on metal or wood and contain wax, the wax being operative to impart a pleasing lustrous appearance to the wood or metal surface being polished and to provide a protective film against dirt and moisture. Carnauba, candelilla and beeswax are commonly used waxes. In the case of a translucent or opaque plastic a wax build-up is undesirable since it causes smearing and clouding of the plastic.

Several of the currently available polishing compositions contain an abrasive as well as a wax constituent. "Polishing" of the surface is achieved primarily by an abrasive action on the surface to remove soil and foreign matter and then a protective film of wax is placed on the cleaned surface. In the present invention the "polishing" effect is derived more from a general cleaning of the surface by the abrasive agent simultaneously with the filling of minute surface scratches by an acrylic filler ingredient and the like. Polishing a translucent or opaque plastic surface with a composition containing an abrasive but no filler material would result in the introduction of a multitude of microscopic scratches in the surface. A polishing effect would not occur; rather there would be a further clouding of the plastic. The composition of the present invention contains a filler as well as an abrasive agent so that tiny scratches are mended as the entire surface is cleaned. Although for the most part the ingredients employed have well-known characteristics, no successful method has been devised previously to formulate a non-wax polishing composition capable of achieving the desired results in a one-step operation. Removal of the minor scratches by filling with a clear, non-yellowing acrylic returns a shiny, unclouded appearance to the plastic. The combined abrading and filling action polishes out scratches leaving a renewed surface.

SUMMARY OF THE INVENTION

In accordance with the present invention the cleaning and filling operations are done in one step. The polish is applied to a dry or damp cloth, rubbed on the surface to be polished, and may be buffed after a short drying time. There is no need first to clean the surface and then apply the filler separately, a process that would require two applications and two buffings. In the present composition the filling is done concurrently with the cleaning and one final buffing removes both the film on the surface and any excess filler that remains around the mended scratches.

It is therefore an object and important feature of the present invention to provide a polishing composition for plastic surfaces which contains no wax ingredient.

Another object is to provide a polish composition which precludes the formation of a residue on the surface to which it is applied.

Another object is to provide an emulsion polishing composition which will prevent the separation of the constituent materials during use or storage of the polishing composition.

A further object is to provide a composition which contains an ingredient to mend minor scratches in translucent or opaque plastic surfaces while polishing or cleaning the surface.

Another object is to provide a method of making such a polishing composition of low-cost available materials in a novel and improved manner.

The preferred form of the present invention provides a composition which includes an intimate mixture of solvents, individual property-imparting ingredients, and a water vehicle or other suitable carrier. The term "individual ingredients" as employed herein means those ingredients included for the particular property which it adds to the polishing composition without altering the other ingredients. The anti-static agent, the filler and the non-smear additive are examples of individual ingredients. In order to maintain an even suspension of the individual ingredients in the polish composition a carrying emulsion composed of stearic acid and triethanolamine is formed. Cetyl alcohol and glycerylmonostearate are added to the base emulsion to stabilize and thicken the emulsion and to obtain a creamier, readily workable emulsion. Inexpensive de-ionized water is the preferred vehicle for the composition and solvent for several ingredients.

An anti-static agent is one of the individual ingredients which is included in the composition to prevent static accumulation and dust attraction. A hydrocarbon solvent such as isopropyl alcohol is added to cut grease and counteract the smearing effect of the anti-static ingredient. The abrasive ingredient is a very finely divided abrasive material such as Kaopolite SFO Powder. An acrylic filler is included to mend scratches through a physical filling of the scratch. A preservative is used to allow storage of the polish for extended periods of time.

The following formulation, Example I, has been found to be most effective in the cleaning and polishing of opaque and translucent plastic surfaces:

EXAMPLE I

| Constituents: | |
| --- | --- |
| Part A: | Percent by weight: |
| stearic acid | 4.00 |
| cetyl alcohol | .75 |
| glycerylmonostearate | 1.25 |
| SN 50 anti-static | .75 |
| isopropyl alcohol | 1.80 |
| Kaopolite SFO | 6.00 |
| Part B: | Percent by weight: |
| triethanolamine | 1.00 |
| BL1 acrylic | .25 |
| de-ionized water | 84.15 |
| Dowicil 200 | .05 |

METHOD OF PREPARATION

The composition set forth in Example I is produced by combining the ingredients in Part A and heating to 75 to 85 degrees Centigrade. Concurrently, the Part B ingredients are combined and heated to 70 to 80 degress Centigrade. Part A is then combined with Part B, stirring continuously, and the resulting composition is cooled to 40 to 50 degrees Centigrade. The final composition is stored in air-tight containers.

EXAMPLE II

| Part A. | Percent by weight: |
|---|---|
| stearic acid | 4.00 |
| cetyl alcohol | .75 |
| glycerylmonostearate | 1.25 |
| Kaopolite | 6.00 |
| Part B: | Percent by weight: |
| triethanolamine | 1.00 |
| BL-1 acrylic | .25 |
| de-ionized water | 86.75 |

The plastic polishing composition of the present invention contemplates a reasonable range of constituent materials. The acceptable range of ingredients may be illustrated as follows:

| Constituents: | |
|---|---|
| Part A: | Percent by weight: |
| stearic acid | 2.00–8.00 |
| cetyl alcohol | .25–2.00 |
| glycerylmonostearate | .75–4.00 |
| SN 50 anti-static | .50–5.00 |
| isopropyl alcohol | 1.00–5.00 |
| Kaopolite SFO | 4.00–10.00 |
| Part B: | Percent by weight: |
| triethanolamine | 1.00–4.00 |
| BL-1 acrylic | .15–.75 |
| de-ionized water | 60.00–90.00 |
| Dowicil 200 | .05–.25 |

By varying the relative amounts of the ingredients, polishing compositions with different physical and chemical properties result. In each case, however, the method of preparation is the same. The following is a discussion of the reactions of the various ingredients and the changes in the chemical and physical properties of the composition as the ingredients are varied outside of the acceptable range.

High molecular weight fatty acids such as stearic acid or oleic acid make up 4 to 8 percent of the composition. Alkanolamines such as diethanolamine or triethanolamine are present in the range of 1 to 4 percent. The reaction between the fatty acid and the alkanolamine forms a water soluble emulsion, an amine soap. The viscosity of this base emulsion increases as the amounts of fatty acid and alkanolamine are increased. A monohydric alcohol such as cetyl alcohol is added to strengthen the emulsion and to aid in the dispersal of the abrasive powder in the composition.

As the amount of cetyl alcohol is increased the emulsion is characterized by a stiffer consistency and is increasingly difficult to spread and work as a polish. Within the acceptable range of ingredients, the present invention has a viscosity comparable to that of a light cream.

Cetyl alcohol along with a glyceryl ester such as glycerylmonostearate acts to thicken and to increase the stability of the emulsion by modifying the surface strengths of the molecules in the different phases. The cetyl alcohol and glycerylmonostearate help to suspend the anti-static, abrasion, filler and solvent particles in the emulsion. The use of inadequate amounts causes the formation of small lumps in the emulsion. Glycerylmonostearate is a self-emulsifying agent with water allowing the use of reduced quantities of the fatty acid and alkanolamine when the amount of glycerylmonostearate is increased. The glycerylmonostearate cannot exceed 4 percent or the composition becomes too stiff, almost paste-like.

Small amounts of an anti-static agent are used in the composition to disperse static charge and to prevent static accumulation by increasing surface conductivity. Amounts in excess of 5 percent result in a smearing of the plastic surface being polished. In the composition described "SN-50" is a 50 percent solution in an aqueous isoproponal solvent mixture of stearamidopropyl-dimethyl-hydroxyethylammonium nitrate. The SN-50 is an anti-static agent sold by American Chemical Corporation, Bound Brook, N.J.

A hydrocarbon solvent such as isopropyl alcohol is used in the range of 1 to 5 percent. Isopropyl alcohol degreases and cleans both oil and water based soils. Its inclusion in the composition counteracts the smearing effect of the anti-static agent, SN-50. The amount of isopropyl alcohol in the composition controls the drying time, that is, the length of time that lapses between application of the polish and its subsequent drying and readiness for buffing. This period should be long enough to adequately spread the polish, but short enough to avoid any undue wait for the polish to dry.

An abrasive material makes up 4 to 10 percent of the composition. Kaopolite SFO Powder is a product sold by Kapolite, Inc., Garwood, N.J. and is preferred since it is the finest particle size polishing agent available, being on the order of 0.70 micron size. Abrasive amounts in excess of 10 percent cause too harsh a polishing action, while amounts under 4 percent are too gentle to be effective.

A clear, hard drying floor wax-type acrylic such as BL-1 Acrylic is preferred as the filler material and is a co-emulsion polymer-wax-resin blend to repair scratchs in the surface of a translucent or opaque plastic. This particular filler is commercially available from Richardson Company, Des Plaines, Ill. Amounts in the range recited have been found to be highly effective so as to enable the polish to quickly and adequately fill in scratches while at the same time not interfering with the cleaning and polishing action of the abrasive material.

A preservative such as Dowicil 200, formaldehyde, methyl paraben, or propyl paraben is used to increase the shelf life of the composition. Dowicil 200 is a preservative sold by Dow Chemical Co., Cleveland, Ohio, and is a 94 percent cis isomer of 1-(3-chloroallyl)-3,5,7-triaza-1-azoniaadamantane chloride. Amounts in the 0.05 to 0.25 percent range are recommended, however, varying outside of this range would not change the physical or chemical differences of the composition, merely result in a larger amount of the preservative.

The balance of the composition is made up of water. De-ionized water is used as the carrier vehicle to minimize electro-static effects and to remove foreign matter.

Although the present invention has been described in terms of particular ingredients and the ranges thereof to be employed, it is to be understood that various modifications and variations in the nature and proportion of the ingredients may be made without departing from the spirit and scope of the invention as defined by the appended claims.

What is claimed is:

1. A cleaning and polishing composition for plastic surfaces and the like comprising an intermixture of:
    an oil phase containing an intermixture of major proportions by weight of a stearic acid and an abrasive agent and minor proportions by weight of a glycerylmonostearate and cetyl alcohol;

a water phase containing an intermixture of a major proportion of water combined with a minor proportion by weight of an alkanolamine selected from the group consisting of diethanolamine and triethanolamine and a minor proportion by weight of a acrylic filler; and the resultant oil phase and water phase forming an emulsion with said abrasive agent and said filler in suspension therein.

2. A cleaning and polishing composition according to claim 1, including an antistatic agent intermixed therein.

3. A cleaning and polishing composition according to claims 1 or 2 said composition containing a minor proportion of a non-smearing agent and a preservative intermixed therein.

4. A cleaning and polishing composition for plastic surfaces and the like comprising in combination:
an oil phase consisting of:
about 4%-8% of a high molecular weight fatty acid selected from the class consisting of stearic acid and oleic acid and mixtures thereof;
about 0.25%-2% of cetyl alcohol;
about 0.75%-4% of glycerylmonostearate
about 0.5%-5% of an anti-static agent;
about 1%-5% of isopropyl alcohol; and
about 4%-10% of a preservative;
a water phase consisting of:
about 1%-4% of an alkanolamine selected from the class consisting of triethanolamine and diethanolamine and mixtures thereof;
about 0.15%-0.75% of an acrylic filler;
about 60%-90% of de-ionized water; and
about 0.05%-0.25% of a preservative;
said oil phase and said water phase being intermixed to form said composition, said percentages being by weight based on the total weight of the composition.

5. A cleaning and polishing composition according to claim 4, said anti-static agent being a 50% solution in an aqueous isopropanol solvent mixture.

6. A cleaning and polishing composition according to claim 4, said acrylic filler being a co-emulsion polymer-wax-resin blend.

7. A cleaning and polishing composition according to claim 4, said preservative selected from the class consisting of formaldehyde, methyl paraben, propyl paraben, and 94% cis isomer of 1-(3-chloroallyl)-3, 5, 7-triaza-1-azoniaadamantane chloride.

8. The method of making a polishing composition for plastic surfaces and the like comprising the steps of:
forming an oil phase (mixture A) comprised of stearic acid, cetyl alcohol, glycerylmonostearate, an abrasive agent, and isopropyl alcohol;
forming an acqueous phase (mixture B) composed of triethanolamine, a filler, de-ionized water, and a preservative;
mixing and heating mixture A to 75°-85° C. and mixture B to 70°-80° C.;
adding mixture A to mixture B with moderate stirring; and
cooling and continued mixing to a temperature of about 40°-50° C.

9. The method according to claim 8 in which the oil phase further includes an anti-static agent.

10. The method according to claim 8 in which the oil phase is comprised of major proportions by weight of the stearic acid and isopropyl alcohol and minor proportions by weight of the cetyl alcohol, glycerylmonostearate and abrasive agent.

11. The method according to claim 8 in which the aqueous phase is composed of a major proportion of de-ionized water combined with minor proportions by weight of triethanolamine and a filler.

12. A non-wax cleaning and polishing composition for plastic surfaces and the like comprising:
a liquid base including a major proportion of water and a minor proportion of a carrier emulsion, said carrier emulsion including a high molecular weight fatty acid selected from the group consisting of stearic acid and oleic acid, an alkanolamine selected from the group consisting of diethanolamine and triethanolamine, and a thickening agent intermixed therein;
abrasive particles suspended in said liquid base; and
a hard-drying filler material intermixed with said liquid base, said filler material adapted for filling scratches in said surfaces.

13. A cleaning and polishing composition according to claim 12 wherein said thickening agent is a mixture of cetyl alcohol and glycerylmonostearate, and said filler material is an acrylic material.

* * * * *